(12) United States Patent
Harris

(10) Patent No.: US 9,316,011 B2
(45) Date of Patent: Apr. 19, 2016

(54) OZONE-ASSISTED FLUID TREATMENT APPARATUS

(71) Applicant: Charles E. C. Harris, Chaing Rai (TH)

(72) Inventor: Charles E. C. Harris, Chaing Rai (TH)

( * ) Notice: Subject to any disclaimer, the term of this patent is extended or adjusted under 35 U.S.C. 154(b) by 176 days.

(21) Appl. No.: 14/306,218

(22) Filed: Jun. 16, 2014

(65) Prior Publication Data
US 2014/0299525 A1  Oct. 9, 2014

Related U.S. Application Data

(60) Continuation-in-part of application No. 13/925,391, filed on Jun. 24, 2013, now Pat. No. 8,753,523, which is a division of application No. 12/686,315, filed on Jan. 12, 2010, now Pat. No. 8,470,170, application No. 14/306,218, which is a continuation-in-part of application No. 14/070,068, filed on Nov. 1, 2013.

(60) Provisional application No. 61/144,093, filed on Jan. 12, 2009, provisional application No. 61/721,423, filed on Nov. 1, 2012.

(51) Int. Cl.
| | |
|---|---|
| E04H 4/12 | (2006.01) |
| C02F 1/78 | (2006.01) |
| C02F 1/00 | (2006.01) |
| C02F 103/42 | (2006.01) |
| C02F 101/10 | (2006.01) |
| C02F 101/20 | (2006.01) |

(52) U.S. Cl.
CPC .............. *E04H 4/1281* (2013.01); *C02F 1/001* (2013.01); *C02F 1/78* (2013.01); *E04H 4/1209* (2013.01); *C02F 2101/101* (2013.01); *C02F 2101/203* (2013.01); *C02F 2101/206* (2013.01); *C02F 2103/42* (2013.01); *C02F 2303/04* (2013.01); *C02F 2303/18* (2013.01)

(58) Field of Classification Search
CPC ... E04H 4/1209; E04H 4/1281; E04H 4/1227; E04H 4/1236; E04H 4/1245; C02F 1/001; C02F 1/78; C02F 2101/101; C02F 2101/203; C02F 2101/206; C02F 2303/04; C02F 2303/18; C02F 2103/42; C02F 7/00; B01F 3/04106; B01F 3/04113; B01F 2003/04191; B01F 2003/0417; B01F 2003/04177; B01F 2003/04865; B01F 2003/04872; B01F 2003/04879; B01F 2003/04886
See application file for complete search history.

(56) References Cited

U.S. PATENT DOCUMENTS

| | | | |
|---|---|---|---|
| 3,692,180 | A | 9/1972 | LaRaus |
| 5,037,550 | A | 8/1991 | Montagnon et al. |
| 5,071,550 | A | 12/1991 | Bernhardt |
| 5,190,648 | A | 3/1993 | Ramsauer |
| 5,641,399 | A | 6/1997 | Rawlins |

(Continued)

*Primary Examiner* — Lucas Stelling
(74) *Attorney, Agent, or Firm* — Donald L. Bartels; Bartels Law Group

(57) ABSTRACT

An apparatus for treating fluid in a main reservoir includes an auxiliary reservoir and filter located outside the main reservoir. Ozonated air bubbles are injected by a diffuser into a lift tube containing fluid from the main reservoir. The fluid flows up the lift tube and into the auxiliary reservoir due to the expansion of the ozonated air bubbles as they go up the lift tube. Fluid flow to and from the main reservoir is via conduits normally used to connect the main reservoir to a conventional high pressure water pump and filter, with check valves added to prevent backflow to/from the auxiliary reservoir and lift tube when the water pump is on. When the water pump is off, the fluid is caused to pass through the auxiliary reservoir and filter and back into the main reservoir as a result of the flow of ozonated air in the lift tube.

18 Claims, 5 Drawing Sheets

(56) References Cited

U.S. PATENT DOCUMENTS

| | | |
|---|---|---|
| 5,695,635 A | 12/1997 | Sasaki et al. |
| 5,711,887 A | 1/1998 | Gastman et al. |
| 5,925,320 A | 7/1999 | Jones |
| 6,939,397 B2 | 9/2005 | Nelsen et al. |
| 8,470,170 B2 * | 6/2013 | Harris .................... C02F 1/001 210/167.12 |
| 8,753,523 B2 * | 6/2014 | Harris .................... C02F 1/001 210/205 |
| 2005/0163648 A1 | 7/2005 | Liang |
| 2010/0200517 A1 * | 8/2010 | Harris .................... C02F 1/001 210/760 |
| 2014/0209521 A1 * | 7/2014 | Harris ...................... C02F 1/78 210/127 |

* cited by examiner

OZONE-ASSISTED FLUID TREATMENT APPARATUS

PRIORITY

The present application is a continuation-in-part of, and claims priority to U.S. patent application Ser. No. 13/925,391, filed Jun. 24, 2013, now U.S. Pat. No. 8,753,523, the entirety of which is incorporated herein by reference. The present application also claims priority to U.S. patent application Ser. No. 14/070,068, filed Nov. 1, 2013, and U.S. Provisional Patent Application Ser. No. 61/721,423, filed Nov. 1, 2012, both entitled Side-Filter Ozone Water Treatment System, the entirety of which are also incorporated herein by reference. The present application also claims priority to U.S. patent application Ser. No. 12/686,315, filed Jan. 12, 2010, now U.S. Pat. No. 8,470,170 and U.S. Provisional Patent Application Ser. No. 61/144,093, filed Jan. 12, 2009.

FIELD OF THE INVENTION

This invention relates in general to fluid treatment systems and methods, and more specifically to apparatus for treating fluid from a fluid reservoir by injecting ozonated air into a lift tube containing fluid from the fluid reservoir.

BACKGROUND

Ozone ($O_3$) is a gas with strong oxidation properties that has been used in many applications including the pool and spa industry as well as treating water in water storage tanks since the early 1900's. Ozone is typically produced by high-intensity ultraviolet (UV) light or by a high-voltage electric field. The normal byproduct of ozone is oxygen ($O_2$). Ozone is created when either UV light or a corona discharge (CD) is applied to oxygen. The oxygen disassociates into single oxygen atoms which recombine into ozone. Ozone has a half life of about 2 to 12 hours in air and about 20 minutes when dissolved in water. Ozone is 13 times more soluble in water than oxygen. Ozone oxidizes and disinfects and deodorizes. Ozone also micro-flocculates iron and manganese and kills bacteria 3,000 times faster than chlorine, kills viruses, algae spores, and some parasites, precipitates heavy metals, controls formation of scales, and oxidizes oils.

Ozone is typically introduced into water to be treated by simply bubbling ozone and air into a tank of water with the use of a diffuser stone (known as an ozone aeration system) or by a venturi eductor used in conjunction with a water pump. Passing water through a venturi eductor creates a suction which draws in ozone and mixes the ozone gas with water. The ozone gas is typically introduced into a contact tank from which undissolved ozone gas is vented, or it is introduced directly into a storage tank and bubbles up through the tank and out the top of the tank. This same type of system has been used to inject ozone into water in swimming pools and spas. In some cases, spa systems have used existing "spa hydrotherapy jets" as the means to "suck in" the ozone gas and mix the gas with the spa water.

Ozone is used in combination with various chemicals in the pool and spa industry. Ozone is also used to treat iron, manganese, and hydrogen sulfide in well water and to kill pathogens in surface waters such as lakes and streams. Ozone systems come in many varieties and ozone is produced in many ways known in the art.

Ozone water treatment systems for water storage tanks are designed to clean "raw" water, e.g., well water, whereas systems for pools and spas are designed to keep treated water clean as it is used over and over again. Prior art ozone aeration systems typically include a filter to remove impurities in a reservoir of water. One prior art system teaches a water purification apparatus suspended inside a water tank. The apparatus includes a filter for filtering the water and a lift tube containing ozonated air bubbles to add ozone to the water in the tank. Such a prior art system is disclosed in U.S. Pat. No. 5,190,648 to Ramsauer, issued Mar. 2, 1993.

In the Ramsauer system, air containing ozone generated by an ozone generator is injected into the bottom of the lift tube using a diffuser, which causes the ozonated air to be converted into bubbles. The ozonated air bubbles up through the water in the lift tube and into the water tank. Excess ozonated air escapes through the top of the tank. As taught in Ramsauer, the lift tube is part of an in-the-tank filter module. The ozone gas mixing and filtration and circulation of the water are accomplished within the filter module assembly. The action of the bubbles rising and expanding in the lift tube causes a current flow, which causes the water to be drawn through the filter where the water is filtered with each pass to thereby filter the water prior to its contact with the ozonated air.

Prior art ozone water treatment systems are generally simple to install since they are positioned inside the fluid reservoir and therefore require no cutting into the wall of reservoir, whether it be a pool, spa, or tank, to install separate lines. However, such a "single" reservoir fluid treatment system is more difficult to maintain, because the filter needs to be pulled from the reservoir for cleaning and maintenance. In addition, the Ramsauer system, for example, does not treat the excess ozonated air bubbles emanating from the fluid in the reservoir after treatment, for destruction or to channel it elsewhere for some other use. There is no mechanism for preventing the pool or spa user from being exposed to this ozonated air bubbling off the surface of the water, and thus having to suffer the damaging effects of ozone on the user's mucus membranes, eyes, and skin.

SUMMARY OF THE INVENTION

The present invention solves the limitations of prior art fluid treatment systems by using an auxiliary reservoir and ozonated air bubbles in a lift tube to treat fluid with ozone before sending the treated fluid to a main fluid reservoir, whether the main fluid reservoir is a pool, spa, or water tank, or some other fluid storage container. After fluid treatment, any excess ozone gas emanating from the fluid may be captured and either destroyed or channeled to another spot.

In one embodiment, the fluid treatment apparatus according to the present invention is connected to already existing conduits that connect fluid in a main reservoir to a conventional high pressure water pump and filter assembly being used to filter the fluid, to augment the filtering provided by the conventional filter assembly. This eliminates the need for separate openings to be made in the main reservoir for installation of the fluid treatment apparatus according to the invention. A check valve is added in each of the conduits that connect the fluid treatment apparatus to the main reservoir's preexisting conduits. The first check valve is installed in the conduit connected to the existing conduit on one side of the conventional water pump to prevent the drainage of fluid from the auxiliary reservoir according to the present invention when the conventional pump is turned on and functioning to suck fluid out of the main reservoir. The second check valve is installed in the conduit connected to the existing conduit on the return side of the conventional water pump to prevent the flooding of the auxiliary reservoir by the injection of fluid coming out of the water pump. In this way, when the conventional water pump is off, the fluid treatment apparatus according to the present invention operates normally. When the conventional water pump is on, fluid flow through the fluid treatment apparatus is prevented.

In one embodiment, ozonated air bubbles in a lift tube lift fluid obtained from one of the main reservoir's preexisting conduits into the auxiliary reservoir positioned to the side of the main reservoir. The flow of fluid in the lift tube increases the height of the fluid level in the auxiliary reservoir above the fluid level of the main reservoir and this difference in fluid level creates a gravity flow of fluid from the auxiliary reservoir back to the main reservoir, via the other preexisting conduit, and allows for the fluid to be filtered by means of a filter positioned outside of the main reservoir and in the path of fluid flow. This enables the filter to trap impurities in the fluid while the ozonated air adds ozone to the fluid in the lift tube by bubble contact. After fluid treatment, the excess ozonated air that bubbles off the surface of the fluid in the auxiliary reservoir may be captured and either destroyed or channeled to another location.

In one embodiment, the fluid filter is installed in the auxiliary reservoir. In this embodiment, the auxiliary fluid reservoir functions to both filter and ozone treat the fluid before sending the treated fluid to the main fluid reservoir. When new fluid is added to the auxiliary reservoir, this gives the filter and ozone treated water an initial opportunity to remove impurities before the new fluid flows into the main reservoir.

Positioning the filter in the fluid path outside of the main reservoir enables the easy cleaning of the filter in a way that prevents impurities captured by the filter from entering the main fluid reservoir. The auxiliary fluid reservoir also enables a conduit to feed fluid from an external source to the auxiliary fluid reservoir. If the filter is positioned in the auxiliary reservoir, the filter may be cleaned while it is still in the auxiliary reservoir, by washing it and letting the particulates drain out the bottom of the reservoir. Moreover, for pools and spas, the auxiliary reservoir allows an ozone generator and ozonated air it produces to operate 24 hours a day, since the auxiliary reservoir is at a comfortable distance from persons using the pool or spa who would otherwise be irritated by any ozonated air bubbling off the surface of the water.

Other embodiments are as shown in the figures.

According to one embodiment, the present invention is an apparatus for ozone-aerating and filtering fluid in a main fluid reservoir, said main fluid reservoir including a high pressure water pump and a high pressure filter, a first conduit for enabling fluid in said main fluid reservoir to flow to said water pump and high pressure filter, and a second conduit for enabling fluid to flow from said water pump and high pressure filter to said main fluid reservoir, for enabling the circulation of fluid in said main fluid reservoir through said water pump and high pressure filter when the water pump is on, comprising: an auxiliary fluid reservoir positioned adjacent to and outside of the main fluid reservoir; a lift tube positioned outside of the main fluid reservoir and having an upper end and a lower end, said lift tube upper end open within the auxiliary fluid reservoir, said lift tube extending below the auxiliary fluid reservoir a predetermined length; a third conduit for enabling fluid in the auxiliary fluid reservoir to flow into the main fluid reservoir via said second conduit, said third conduit including a check valve for preventing fluid flow in a direction from said second conduit to said auxiliary fluid reservoir; a fourth conduit for enabling fluid to flow by gravity from the main fluid reservoir into the lower end of said lift tube via said first conduit, said fourth conduit including a check valve for preventing fluid flow in a direction from the lower end of said lift tube to said first conduit; a diffuser positioned inside said lift tube at its lower end for injecting ozonated air bubbles into the fluid in said lift tube, such that, when ozonated air bubbles are injected into said lift tube by the diffuser, the ozonated air bubbles come into contact with the fluid in said lift tube and ozone-aerates said fluid, and wherein the expansion of the ozonated air as it bubbles up said lift tube causes fluid in said lift tube to flow up said lift tube and into the auxiliary fluid reservoir, which causes the level of fluid in the auxiliary fluid reservoir to rise higher than the level of fluid in the main fluid reservoir, and thereby cause ozone-aerated fluid in the auxiliary fluid reservoir to flow by gravity into the first fluid conduit and into the main fluid reservoir at the same time causing fluid to be drawn through said second fluid conduit from the main fluid reservoir and into said lift tube; and a low pressure fluid filter positioned outside of the main reservoir and in the fluid path formed by said third and fourth fluid conduits, said lift tube, and said auxiliary fluid reservoir, for filtering the fluid flowing therein.

According to another embodiment, the present invention is an apparatus for ozone-aerating and filtering fluid in a pool having an infinity edge that enables water to flow out of said pool over said edge, a collection gutter for collecting the water flowing over said infinity edge, and a collection tank, said pool including a high pressure water pump and a high pressure filter, a first conduit for coupling the water in said collection tank to a water pump and high pressure filter, a drain conduit for coupling water from the bottom of said pool to said water pump, and a second conduit for connecting the water output by said water pump and high pressure filter to said pool for enabling the circulation of fluid in said pool through said water pump and high pressure filter when the water pump is on, comprising: an auxiliary fluid reservoir positioned adjacent to and outside of the pool; a lift tube positioned outside of the pool and having an upper end and a lower end, said lift tube upper end open within the auxiliary fluid reservoir, said lift tube extending below the auxiliary fluid reservoir a predetermined length; a third conduit for enabling fluid in the auxiliary fluid reservoir to flow into the pool via said second conduit, said third conduit including a check valve for preventing fluid flow in a direction from said second conduit to said auxiliary fluid reservoir; a fourth conduit connected to said drain conduit for enabling fluid to flow by gravity from the main fluid reservoir into the lower end of said lift tube via said drain conduit, said fourth conduit including a check valve for preventing fluid flow in a direction from the lower end of said lift tube to said first conduit; a diffuser positioned inside said lift tube at its lower end for injecting ozonated air into the fluid in said lift tube, such that, when ozonated air bubbles are injected into said lift tube by the diffuser, the ozonated air bubbles come into contact with the fluid in said lift tube and ozone-aerates said fluid, and wherein the expansion of the ozonated air as it bubbles up said lift tube causes fluid in said lift tube to flow up said lift tube and into the auxiliary fluid reservoir, which causes the level of fluid in the auxiliary fluid reservoir to rise higher than the level of fluid in the main fluid reservoir, and thereby cause ozone-aerated fluid in the auxiliary fluid reservoir to flow by gravity into the first fluid conduit and into the main fluid reservoir at the same time causing fluid to be drawn through said second fluid conduit from the main fluid reservoir and into said lift tube; and a low pressure fluid filter positioned outside of the main reservoir and in the fluid path formed by said third and fourth fluid conduits, said lift tube, and said auxiliary fluid reservoir, for filtering the fluid flowing therein.

BRIEF DESCRIPTION OF THE DRAWINGS

The accompanying drawings, which are incorporated in and constitute a part of this specification, exemplify embodiments of the present invention and, together with the description, serve to explain and illustrate principles of the invention and not to limit the claimed invention thereto. The drawings are intended to illustrate major features of the exemplary embodiments in a diagrammatic manner. The drawings are not intended to depict every feature of actual embodiments nor relative dimensions of the depicted elements, and are not drawn to scale. Note also that reference symbols or names are used in the Figures to indicate certain aspects or features shown therein, with reference symbols common to more than one Figure indicating like components, aspects or features shown therein.

DETAILED DESCRIPTION

Figure 1:
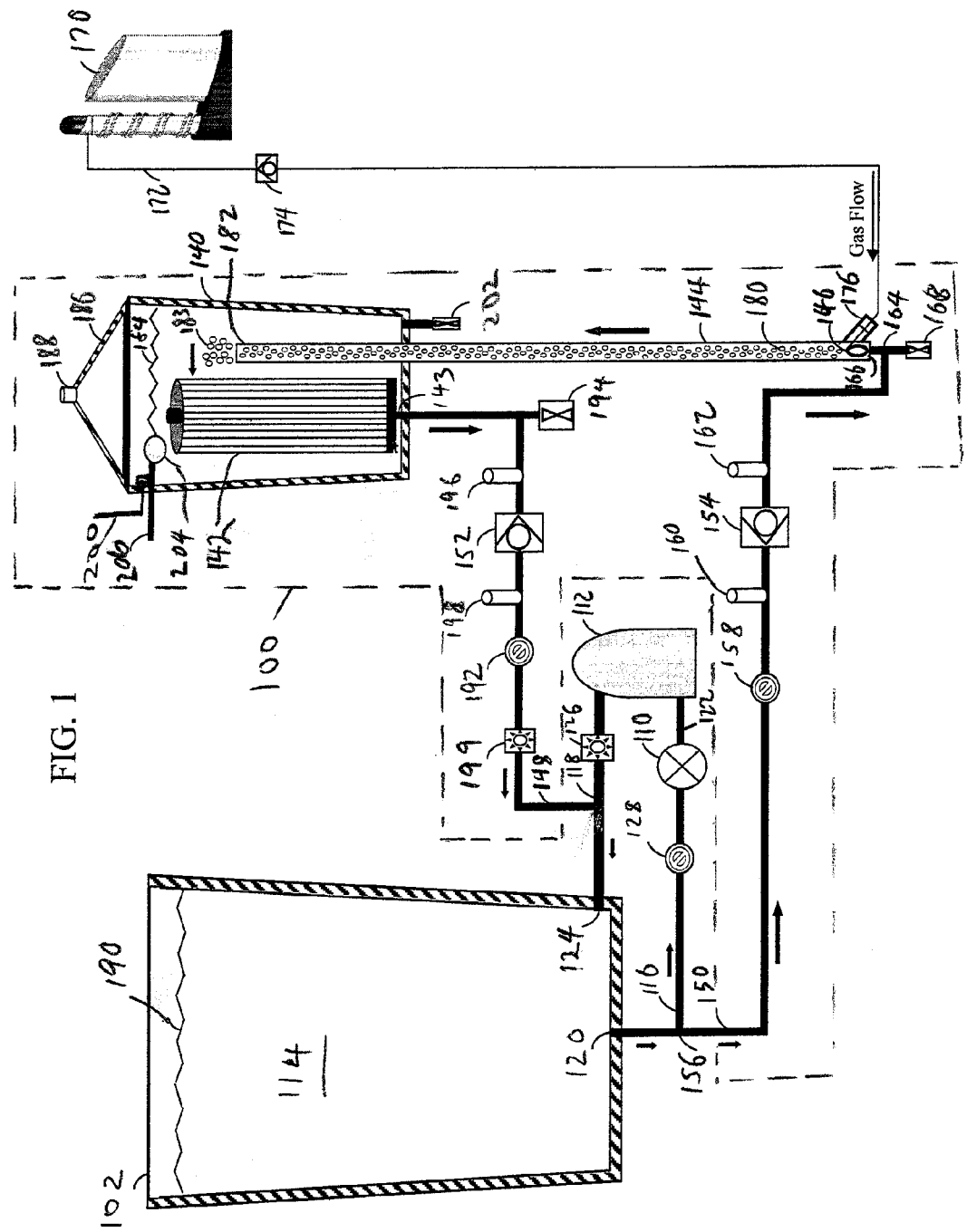
FIG. 1 illustrates an ozone-assisted fluid treatment apparatus for a fluid reservoir according to one embodiment of the present invention.

In one embodiment, the fluid treatment apparatus according to the present invention is connected to already existing conduits that connect fluid in a main reservoir to a conventional high pressure water pump and filter assembly being used to filter the fluid, to augment the filtering provided by the conventional filter assembly. This eliminates the need for separate openings to be made in the main reservoir for installation of the fluid treatment apparatus according to the invention. An ozone generator pumps a mixture of ozone and air into a diffuser positioned at the bottom of a lift tube filled with fluid from the main reservoir, to generate bubbles in the fluid. These bubbles expand as they rise up the lift tube. These bubbles create an upward flow in the fluid contained in the lift tube. The flow of fluid in the lift tube causes the fluid to flow through a filter without the use of any conventional fluid pump. The fluid flows past the filter solely due to the effect of ozonated air bubbles released inside the lift tube. The upper end of the lift tube is preferably positioned to discharge the fluid in the lift tube into an auxiliary reservoir. The fluid in the auxiliary reservoir flows back into the main reservoir via the force of gravity. As a result, the fluid treatment apparatus according to the present invention produces a gentle, controlled flow of ozonated fluid into a pool, spa, or storage tank. Where the main reservoir is a pool or spa, one goal is to create a more desirable experience for a user of the pool or spa, as compared to a system where a conventional fluid pump is used to supply ozonated fluid. The level of ozone in the treated fluid can be controlled by various system parameters, including, but not limited to, ozone generation rate, ratio of air and ozone in the mixture that is released in the lift tube fluid by the diffuser, the dimensions of the auxiliary reservoir and the main reservoir, the dimensions of the lift tube, etc.

In many parts of the world, many pools, spas, surge tanks, and storage tanks are only one meter high. Placing a diffuser stone at a depth of only one meter reduces the time allowed for ozone and oxygen to dissolve into the water, with the result that the efficiency of such a fluid treatment system is reduced.

A key aspect of each of the embodiments of the present invention described herein is that the lift tube length is not limited by the depth of the reservoir containing the fluid to be treated. The present invention enables the efficient use of ozone aeration technology by allowing the diffuser stone to be positioned preferably at about 3 meters below the surface of the water in the main fluid reservoir with a flow rate of ozonated air at about 3 to 3.5 psi, regardless of whether the pool, spa or other fluid reservoir is deep or shallow (or a storage tank is tall or short), by the use of a lift tube whose lower end is at a lower level than the bottom of the reservoir. In general, the deeper the diffuser stone is positioned in a lift tube, the more that ozone is able to dissolve into the fluid in the lift tube. In other words, the deeper the diffuser stone, the longer the bubbles are in contact with the fluid, thereby increasing the amount of ozone that dissolves into the fluid in the lift tube as the bubbles rise to the top. On the other hand, the deeper the diffuser stone, the greater the air pressure needs to be in order to prevent a drop off in the amount of ozonated air bubbles generated by the diffuser. Thus, for a given ozone generator having an air pump with a fixed air pressure output, a diffuser positioned deeper in the lift tube may result in a decrease in the amount of air bubbles emanating from the diffuser, with a resulting decrease in the circulation flow of water through the treatment system.

Although water is the preferred fluid to be treated according to the present invention, persons skilled in the art will appreciate that the same apparatus can be used for treating other fluids (the term "fluid" encompasses both liquid and gas and liquid/gas mixtures) without diverting from the scope of the invention. Similarly, the term "reservoir" encompasses spas, pools, storage tanks, treatment/filter tanks, etc. Additionally, the term "ozonated air" or "ozone-treated air" are synonymous, meaning a volume of air and ozone gas mixed together.

Ozone in high concentrations destroys pathogens, spores, algae and various germs and it also oxidizes a number of impurities such as iron, manganese, oils and organic wastes. According to the present invention, a high volume of treated air is pumped into the fluid along with a relatively low concentration of ozone. Ozone in low concentrations may not kill all pathogens. However, ozonated fluid helps to hinder the growth of many bacteria and may reduce pH fluctuations by, for example, obstructing the nitrogen cycle. The relatively gentle fluid flow past the filter also helps to keep the fluid clean too, because many impurities that would normally be pushed through a filter as a result of the force applied by a conventional fluid pump to the fluid are instead trapped by the ozone aeration and filtration apparatus according to the present invention. The advantage of using an ozone aeration system according to the present invention is that it renders the fluid in the pool, spa, or tank rather inhospitable as a growth medium; i.e., bacteria and algae that might otherwise flourish in another environment seem to be greatly reduced because of the lack of nutrients and other conditions needed for growth and reproduction. While the lift tube and auxiliary reservoir may contain fluid that has detectable levels of dissolved ozone in the fluid, it is not certain that the minimum recommended detectable levels of ozone required for disinfection (0.05 ppm) would be present. However, the low level of ozone concentration may add other benefits to the aeration and filtration system by allowing the filter media itself to form a bio-film composed of protozoa, bacteria, algae, and other living organisms that act as a kind of bio-filter itself with its own "ecosystem". As the water passes through the bio-film, the bio-film consumes and traps many impurities which would otherwise contaminate the pool, spa, or water tank, impurities that would otherwise create conditions fostering the growth of bacteria, algae, as well as create chemical conditions which might make the water unusable for humans. For example, such impurities could otherwise create variations in the nitrogen cycle (making ammonia) and volatile fluctuations in the acid/base pH of the water. A very high level of ozone and the use of chemicals such as chlorine, bromine, or salt (which is used to make chlorine), as used in conventional water treatment systems, may hinder the formation of such a biofilm on the filter media, or destroy such the biofilm if it has already formed.

The concept of using a biofilm for water treatment is not new. However, the inventor is not aware of its use for pools and spas. Normally, the idea comes from its use with slow sand filters which form a gelatinous layer called a Schmutzdecke (a grime or filth cover in German coined by the scientist who discovered its significance for water treatment) in the top few millimeters of the sand layer. The Schmutzdecke consists of bacteria, fungi, protozoa, worms, and a range of aquatic life. The Schmutzdecke is the layer that provides the effective treatment in potable water treatment using the sand as the underlying support medium for this biological treatment layer. As water passes through the Schmutzdecke, particles of foreign matter are trapped in the layer and dissolved organic material is adsorbed and metabolized by the bacteria, fungi and protozoa. In the present invention, the filter media, such as a Reemay media, provides the support for the Schmutzdecke as it adsorbs and metabolizes the dissolved and suspended organic materials in the main fluid reservoir. The formation of a Schmutzdecke on the fluid filter is only made possible by the combination of the gentle 24 hour filtration and ozone/aeration provided by the apparatus according to the present invention, with the low concentration of ozone and treated purified air keeping a pool, spa, or water tank exceptionally clean. So clean, in fact, that the need to use chemicals is greatly reduced or eliminated entirely.

It should be noted that the ozone fluid treatment embodiments disclosed in the present application are configured to work in tandem with traditional high pressure fluid pump and high pressure filter systems that are commonly employed in conjunction with pools, spas, and other fluid reservoirs. Although these traditional pumps and filters are separate from the ozone system, according to embodiments of the invention, the same conduits used for feeding fluid to and from the reservoir and the fluid pump and high pressure filter are used by the apparatus of the invention. The reason to add the ozone fluid treatment to a pool, spa, or water storage tank is that it greatly reduces or entirely eliminates the need for chlorine, chemicals, salts, clarifiers, Ph stabilizers, or other additives that are normally needed to keep a pool, spa, or other reservoir clean.

A related patent application, Ser. No. 12/634,652, by the same inventor, titled, "Ozone Generator Apparatus and Method for Purification of Air or Liquids," filed Dec. 9, 2009, discloses a unique ozone generator which provides significant improvements to existing pool, spa, and fluid storage tank ozone fluid treatment systems. That patent application is incorporated herein in its entirety by reference.

For pools, spas, and water storage tanks, the ozone generator described in application Ser. No. 12/634,652, preferably is the "double UV and double air pump system" which operates continuously 24 hours a day and produces about 6-10 grams of ozone in the same time period. It also produces about 10,000 liters of ozonated air per 24 hours. Ozone is produced by pumping filtered and heated ambient air past one or more special ozone producing UV lamps housed in a sealed chamber. The treated air is pumped through the ozone lamp housing at the rate of about 7 liters per minute at an average pressure of about 3 psi. Ozone makes up less that 1% of the total output (most UV ozone generators produce ozone on the order of 0.1 to 0.01% by weight of air fed to the generator)— the other 99% of the gas stream is air that has preferably been pre-treated, i.e., air that has been filtered and heated in order to be relatively free of pathogens, germs, algae spores, dust, and other impurities. Preferably, this mixture of air and ozone gas is piped to a diffuser positioned inside a lift tube filled with water. The diffuser releases thousands of tiny bubbles which cause the water to rise and cause a flow of water through a filter. For smaller pools and water storage tanks containing approximately 25,000 liters, the fluid treatment apparatus of the present invention should work efficiently in conjunction with an ozone generator having the above described ozonated air output. For a pool having a 50,000 liter capacity, for example, two ozone generators would be needed, and possibly a second diffuser positioned in the lift tube as well. For a spa kept at a much higher temperature than a pool, one ozone generator may be appropriate for every 5,000 liters of fluid in the spa.

As ozone can be made from many different devices (such as a corona discharge ("CD") system), any gas that comprises ozone and clean treated air having a similar ratio to the ratio described above, can be used in an ozone water treatment system according to the present invention. One consideration in determining the ratio of ozone to ambient air is the comfort of the users, as too high an ozone concentration would be irritating to the eyes and skin, and might inhibit the benefits of maintaining a biofilm filter on the system's fluid filter. On the other hand, users who did not observe proper hygiene, or who used lavish amounts of sun tan oils, or a pool or spa that is quite large or not covered, might require the use of an ozone generator with a higher output than the preferred apparatus mentioned here, or the use of multiple ozone generators and lift tubes. To make room for more bubbles, to treat fluid in larger capacity reservoirs, the lift tube diameter can also be increased.

Referring now to FIG. 1, shown in this figure is an ozone-assisted fluid treatment apparatus 100 for a main fluid reservoir 102 according to one embodiment of the present invention. As seen in FIG. 1, a conventional high pressure water pump 110 and high pressure filter 112 filters the fluid 114 in main fluid reservoir 102 when the water pump 110 is on. Filter 112 can be a conventional sand filter or the like. Fluid is fed to water pump 110 via a first conduit 116 whose first end is connected to main reservoir 102 at drain opening 120. Fluid from the water pump is fed to high pressure filter 112 by another conduit 122. The filtered fluid output from filter 112 is fed back to the main fluid reservoir 102 at opening 124 via a second conduit 118. The direction of fluid flow in conduits 116 and 118 are indicated by arrows next to these conduits. A conventional water heater 126 may be included in the path between the high pressure filter 112 and the main reservoir to enable heating of the fluid in main fluid reservoir 102. A conventional valve 128 may be included in first conduit 116 to isolate water pump 110 from main fluid reservoir 102 to enable maintenance of the water pump 110 or the like.

The components of the fluid treatment apparatus 100 according to one embodiment of the present invention includes an auxiliary fluid reservoir 140, a lift tube 144, third and fourth conduits 148 and 150, and a low pressure fluid filter 142. Third conduit 148 includes a first check valve 152 and fourth conduit 150 includes a second check valve 154.

As seen in FIG. 1, fourth conduit 150 is connected in a conventional fashion at a junction 156 to first conduit 116 to enable fluid from a pool, spa, or other main fluid reservoir 102 to flow into fourth conduit 150. Each of these conduits is preferably 2 inches in diameter. Fourth conduit 150 preferably has a slope of at least 5 degrees downwards to allow trapped air in the fourth conduit to exit into the first conduit and from there to the surface of the main fluid reservoir 102. The fourth conduit has an on-off fluid flow control valve 158 and two air release valves 160 and 162, one on each side of second check valve 154.

The 5 degree slope in fourth conduit 150 (and a similar slope in the third conduit, as described below) is intended to prevent air from getting trapped in the fluid line. Trapped air acts like a valve which restricts or prevents the fluid from flowing. It may not be necessary for a given fluid conduit to have a slope, especially where there is also an air release valve in the pipe. Nevertheless, the slope is useful for preventing the unwanted trapping of air.

Low pressure fluid filter 142 may be positioned anywhere in the fluid path defined by the third and fourth conduits 148 and 150 and auxiliary fluid reservoir 140 in order to filter the fluid flowing in this path. Filter 142 preferably includes a filter media comprising folds of continuous filament spun-bonded polyester called Reemay® because of its high efficiency and large surface area. However, other conventional filter media may be used, such as polypropylene fibers, and sand, or diatomaceous earth filters may be used. In the embodiment shown in FIG. 1, fluid filter 142 is located in auxiliary fluid reservoir 140. Filter 142 could also be in a separate filter tank (not shown) connected along either conduit 148 or conduit 150. Such a separate filter tank may include a removable access lid and a drain valve for enabling filter 142 to be periodically drained and cleaned.

Fourth conduit 150 goes down preferably at least several feet before connecting to the lower end of lift tube 144. In one embodiment, this connection is a 3-way connector 164 whose other end is connected to a drain valve 168. The fluid in fourth conduit 150 flows into lift tube 144 at its lower end 166. In lift tube 144, the fluid comes in contact with bubbles of ozone gas and air (so-called ozonated air) produced by diffuser 146. Diffuser 146 is preferably a conventional diffuser stone. The ozonated air is produced by an ozone generator 170 which pumps pressurized ozone and air into an ozonated air line 172, a fifth conduit, which connects to diffuser 146. Ozone generator 170 can be a CD, UV, or other form of ozone generator known in the art. An air line check valve 172 may be included in air line 172 to prevent fluid from lift tube 144 going back up air line 172 and into ozone generator 170 and damaging generator 170.

Figure 2:
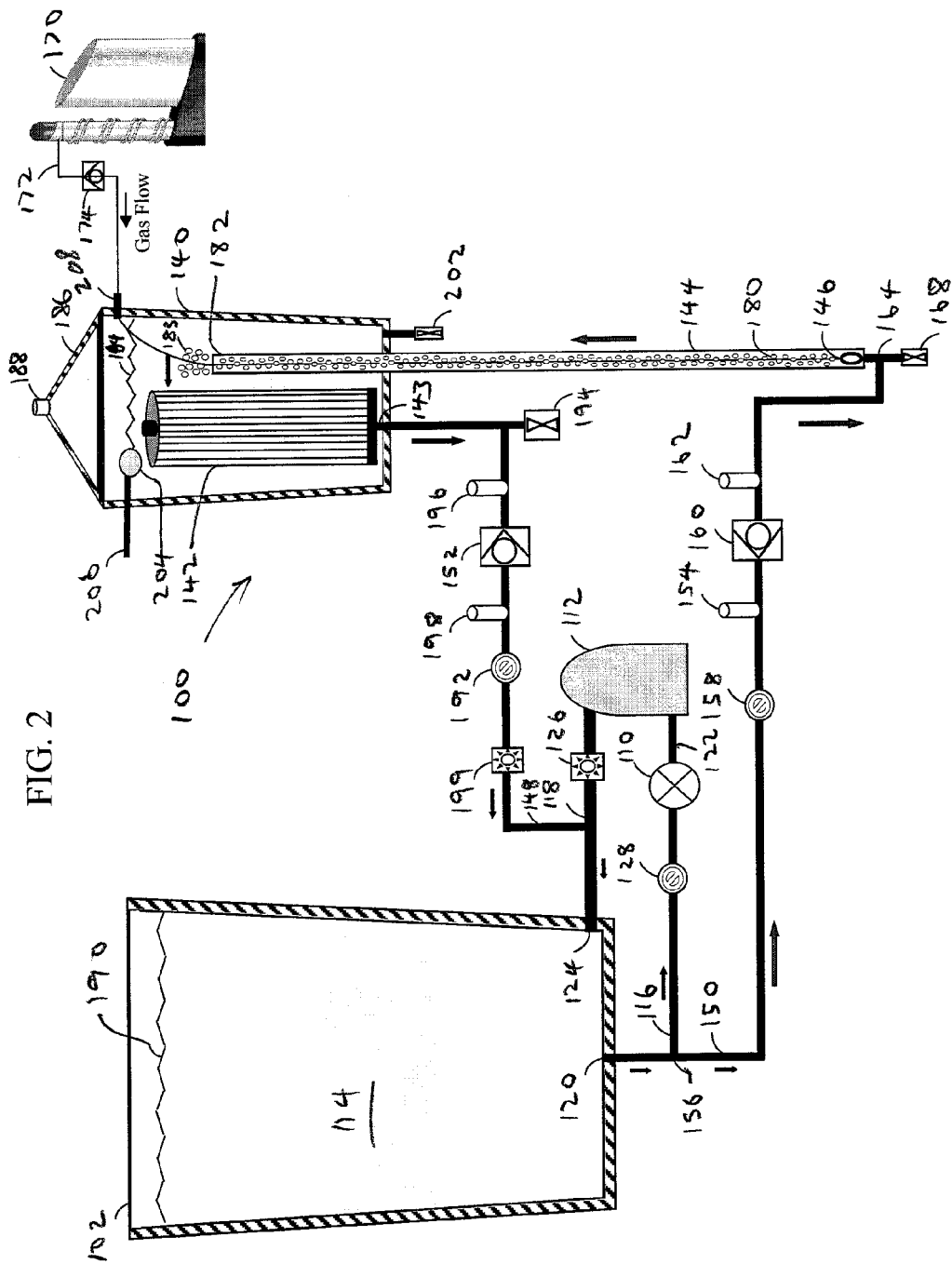
FIG. 2 illustrates an ozone-assisted fluid treatment apparatus for a fluid reservoir according to another embodiment of the present invention.

Diffuser 146 and the out-flow end of ozonated air line 172 can be positioned in lift tube 144 by either being lowered down into the lift tube through its open upper end, as illustrated in FIG. 2, discussed below, or positioned in the lift tube through a Y connector 176. Normally a Y connector would not be practical because the lift tube in many cases will be buried at least several feet into the ground. In such a case, it would be more convenient to lower the diffuser 146 directly down into the lift tube from its top. However, in some situations, for example if the main fluid reservoir comprises a plurality of storage tanks located on the top of a building, and the lift tube is attached to the side of the building, it may be very convenient to connect the ozone line through a Y connector at the bottom of the lift tube. In addition, one has to periodically clean the diffuser stone, and to do so, it needs to be removed from the lift tube 144 and soaked in Muriatic acid, in the case where there is the need to dissolve iron or manganese that may clog the diffuser stone over time, or some other conventional cleaner. This is another reason for inserting and removing the diffuser via the top of the lift tube 144 in most configurations, rather than through a Y connector 176. Fluid control valve 158 and drain valve 168 are used when accessing the diffuser 146 via Y connector 176. Fluid control valve 158 is closed to prevent fluid from flowing to the bottom of the lift tube 144 and out Y connector 176 when the Y connector 176 is opened, and drain valve 168 enables the fluid in lift tube 144 to be drained out after valve 158 is closed and before Y connector 176 is opened.

The diffuser 146 releases the ozonated air into the fluid in lift tube 144 in the form of thousands of small bubbles 180 of ozonated air. Lift tube 144 preferable has a diameter of 1.5 to 2 inches and a length of about 10 feet (3 meters). Lift tube 144 preferably is oriented straight up to prevent the ozonated air bubbles in lift tube 144 from coalescing. The rising ozonated air bubbles 180 pull the fluid upwards inside the lift tube 144. In general, the longer the lift tube the better, as it provides more contact time between the fluid and the ozonated air bubbles, to enable more ozone to both dissolve in the fluid and to produce more lift of the fluid and a higher fluid flow rate. As noted above, a limiting factor on the length of the lift tube is the ability of the diffuser to emit bubbles, since the fluid pressure exerted on the diffuser increases as the lift tube's length is increased and the diffuser is positioned deeper in the lift tube.

The upper end 182 of lift tube 144 is open within auxiliary fluid reservoir 140. The lift tube 144 lifts the fluid into auxiliary fluid reservoir 144 under the force of the rising ozonated air bubbles in lift tube 144. The auxiliary fluid reservoir 144 should be located adjacent to the main fluid reservoir 102, preferably about 3 feet away, to provide some distance between the main fluid reservoir, when it is a pool or spa, and the area where the excess ozonated air dissipates in the air. Auxiliary fluid reservoir 140 may be fitted with a screen or semi-sealed top 186 to prevent insects, birds, leaves, dust, etc. from falling into the fluid in the auxiliary reservoir 140 and/or to capture the excess ozonated air emanating from the surface of the fluid in reservoir 140 for later use or conversion back to simple oxygen. A hole 188 in top 186 may be used to pipe away any excess ozonated air from reservoir 140 via another air line (not shown).

The auxiliary reservoir 140 should be preferably sized to hold about 30 to 50 gallons and be at a level so that the upper rim of the auxiliary reservoir is preferably about 12 inches above the fluid level of the main fluid reservoir 102. The bottom of auxiliary reservoir 140 is preferably at least about 20 inches below the surface of the fluid in the main fluid reservoir. Where the fluid filter 142 is positioned within auxiliary fluid reservoir 140, reservoir 140 needs to be of sufficient size to enable filter 142 to be fully submerged in the fluid contained in auxiliary reservoir 140 during normal operation of the water treatment apparatus 100 according to the present invention. When the main fluid reservoir 102 is empty, preferably all of the fluid in the auxiliary reservoir 140 should be able to drain back into the main fluid reservoir 102.

The upper end 182 of lift tube 144 should be positioned at such a level as to be no higher than the fluid level 190 of the main fluid reservoir 102. A higher entry point might still be functional in certain situations, but the flow rate of the fluid in the lift tube 144 would decrease until at some point as the upper end 182 of the lift tube 144 is raised higher and higher above the fluid level 190 of the main fluid reservoir 102, the lift from the rising bubbles 180 would not be great enough to pull the fluid up and out of the lift tube 144 upper end 182. Note that bubbles 183 that have exited the upper end 182 of lift tube 144 also are in contact with the fluid in auxiliary reservoir 140, and therefore continue to cause ozone to dissolve into the fluid before the remaining bubbles finally emanate from the surface 184 of this fluid.

The fluid with dissolved ozone in auxiliary reservoir 140 flows back to the main fluid reservoir 120 through third conduit 148, second conduit 118, and opening 124. Conduit 148 is preferably a 2 inch pipe positioned to have a downward slope of at least 5 degrees (to let trapped air escape and for easy maintenance). Third conduit 148 is also fitted with an on-off fluid flow control valve 192, a drain valve 194, and two air release valves 196 and 198 one positioned on each side of check valve 152. Valve 192 and drain valve 194 function to prevent fluid from contaminating the main fluid reservoir 102 during cleaning or removal of filter 142, when filter 142 is positioned inside of auxiliary fluid reservoir 140. Air release valves 196 and 198 enable the release of any air trapped in the third conduit 148.

When filter 142 is positioned in auxiliary fluid reservoir 140, the base 143 of filter 142 is preferably directly connected to third conduit 148 in order to enable fluid filtered by filter 142 to flow directly into conduit 148 after the fluid in auxiliary reservoir 140 has been filtered.

An overflow sensor 200 is positioned above the normal fluid level 184 in auxiliary fluid reservoir 140. Sensor 200 operaties to generate an alarm signal when sensor 200 detects when the fluid in reservoir 140 rises above a predetermined level. This typically will occur when the filter 142 has become clogged, thereby preventing fluid from passing through filter 142 and back into the main fluid reservoir 102. Once the filter is cleaned, the fluid level 184 would again be at its normal level of about 8 cm above the level 190 of the fluid in main reservoir 102 once the apparatus 100 is again operating. A drain valve 202 in auxiliary fluid reservoir 140 can be opened to allow fluid in auxiliary fluid reservoir 140 to drain out if filter 142 is being cleaned in situ in reservoir 140. Fluid control valve 192 and fluid control valve 158 may need to be closed during cleaning of filter 142, depending on where filter 142 is located in the fluid path of apparatus 100, in order to prevent contaminating the fluid in the main fluid reservoir 102 during this cleaning process.

A float valve 204 is preferably positioned in said auxiliary fluid reservoir 140 for sensing when the fluid level 184 in said auxiliary fluid reservoir 140 drops below a predetermined level. A sixth conduit 206 connected between said auxiliary fluid reservoir 140 and an external fluid source (not shown) enables fluid to be added to said auxiliary fluid reservoir 140 in response to the sensing by float valve 204 of the low fluid level.

An optional heater 199 may be positioned somewhere in the fluid path of the fluid treatment apparatus 100. Such a heater might be a passive solar heater, for example, that would be operational during daylight hours.

Check valve 152 functions to prevent the water pump 110 from, among other things: 1) draining water out of the auxiliary fluid reservoir 140 as the water pump 110 pumps water from the main fluid reservoir 102. Check valve 154 functions to prevent flooding of the auxiliary fluid reservoir 140 as the water pump 110 pumps fluid back into the main fluid reservoir 102 after the fluid has passed through the pump 110, sand filter 112, and heater 126.

The fluid path for fluid in the ozone-assisted water treatment apparatus 100 shown in FIG. 1 is therefore from the main fluid reservoir through the first and fourth conduits 116 and 150, respectively, up the lift tube 144 and into the auxiliary fluid reservoir 140, and from there through filter 142 and back into the main fluid reservoir via the third and second conduits 148 and 118, respectively, with fluid flow being created by the bubbles in the lift tube 144 generated by diffuser 146. The location of the drain opening 120 and opening 124 in main fluid reservoir 102 can be adjusted (and preferably positioned as far apart as practical) so that there is maximum water flow and circulation of the entire contents of the main fluid reservoir through the operation of the fluid treatment apparatus 100.

Note that, where the water pump 110 and/or filter 112 are above the water level of the main fluid reservoir, i.e., drain line conduit 116 goes up to the water pump, 110, the fluid treatment apparatus 100 would have to be connected to conduit 116 below the water level 190 of the reservoir 102 in order for the apparatus 100 to function. In a case such as that, there is still no need to create a new hole in the reservoir 102 in order to connect up the apparatus 100. However, there may be the need to excavate beneath a surrounding deck or concrete pad in order to access the conduit 116.

FIG. 2 illustrates an ozone-assisted fluid treatment apparatus for a fluid reservoir according to another embodiment of the present invention. In the embodiment shown in FIG. 2, the diffuser 146 is shown installed in lift tube 144 through its upper end 182. As is illustrated, the position of the diffuser 146 at the bottom of lift tube 144 is determined by the length of air line 172 that extends into the lift tube 144. Air line 172 may enter the auxiliary fluid reservoir via an opening 208.

Figure 3:
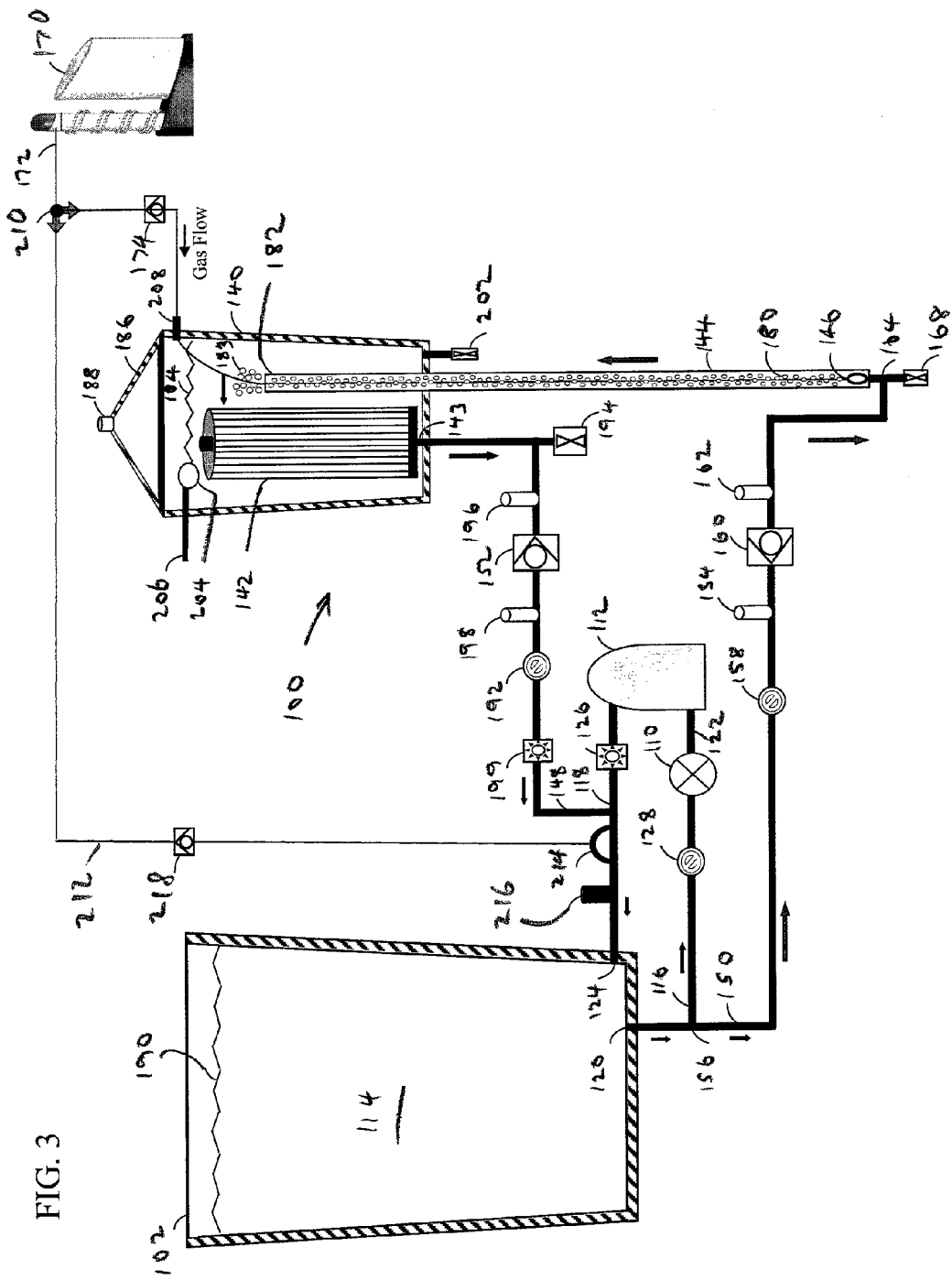
FIG. 3 illustrates an ozone-assisted fluid treatment apparatus for a fluid reservoir according to a third embodiment of the present invention.

FIG. 3 illustrates an ozone-assisted fluid treatment apparatus for a fluid reservoir according to a third embodiment of the present invention. In the embodiment shown in FIG. 3, the ozonated air from the ozone generator 170 is used even when the water pump 110 is on. In the embodiment shown in FIG. 1, when the water pump 110 is on, the ozonated air just dissipates from the surface of the fluid in the auxiliary reservoir 140. In the embodiment shown in FIG. 3, when the water pump 110 is on, the ozonated air is redirected by a second air line 212 to a conventional ozone venturi delivery system 214 to the fluid being pumped by water pump 110. With this alternative, there is no wasted ozonated air going into the lift tube when the pool pump is operating. The next object downstream from venturi delivery system 214 is a contact chamber and de-gas system 216 for the ozone so that ozone bubbles that are not absorbed by the fluid are not coupled to the main fluid reservoir. Alternately, system 216 can be omitted since only a fairly small amount of ozone would reach the main fluid reservoir 102 if the system 216 was not included. A conventional solenoid valve 210 can be used to switch the ozonated air from being coupled to the diffuser 146 to the ozone venturi when the water pump 110 is switched on. A second check valve 218 may need to be installed in air line 212 in order to prevent fluid from backing up into the ozone generator 170 and thereby damaging generator 170. This is especially the case if the ozone generator 170 is positioned below the level of the fluid in the main fluid reservoir.

Figure 4:
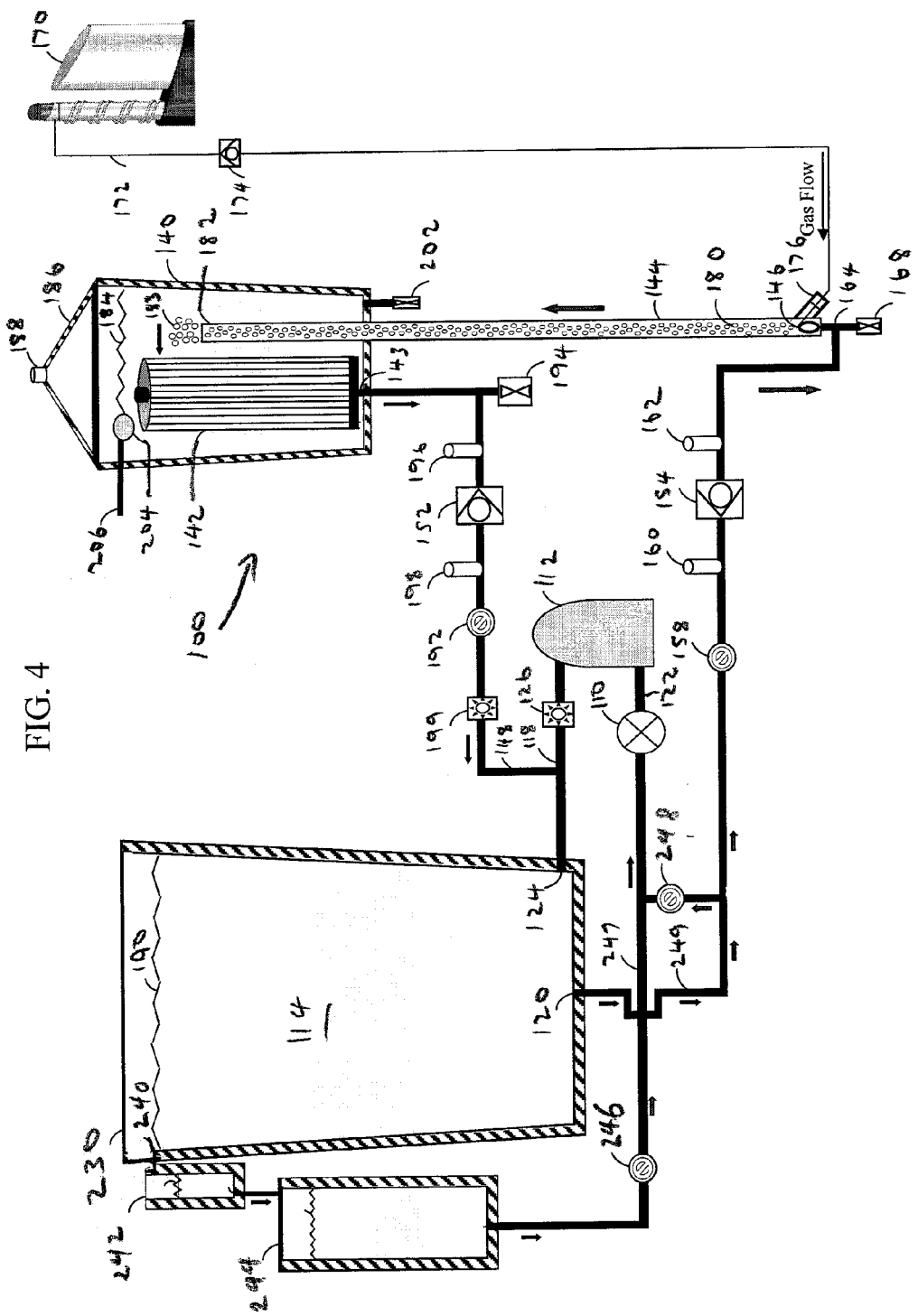
FIG. 4 illustrates an ozone-assisted fluid treatment apparatus for a fluid reservoir according to a fourth embodiment of the present invention.

FIG. 4 illustrates an ozone-assisted fluid treatment apparatus for a fluid reservoir according to a fourth embodiment of the present invention. FIG. 4 illustrates the use of the apparatus 100 where the main fluid reservoir is a pool 230 having an infinity edge water circulation component 240. As seen in FIG. 4, the water pump 110 is pulling water from a surge tank or a collector tank 244 that has pool water collected from a gutter 242 that runs along the length of the pool below the infinity edge 240. Surge tanks are often used with infinity edges where the water overflows into some trough or gutter and then by gravity falls into the surge tank. During the circulation cycle, the water pump 110 pulls water from the surge or collector tank 244 via conduit 247 and pushes the water through filter 112 and heater 126 and then back to the pool 230. The water level in the surge tank 244 is typically well below the water level of the pool 230. For such pools where the water level in the collector tank 244 is lower than the pool water level, the apparatus 100 needs to be tied into the main drain of the pool via conduit 249 since the water needs to be obtained from the "pool level" so as to enable the water to be lifted by the lift tube 144 above the pool level to create the desired fluid flow through the apparatus 100. In other words, if we tied the apparatus 100 into a water line connected to the surge tank 244, the apparatus 100 could not get water flowing back to the pool 230 since the apparatus 100 can only lift the water about 8 cm above the water level of the surge tank 244.

Typically, the main pool drain is connected to the water pump via a fluid control valve 248 so that a pool can be drained completely. The apparatus 100 would simply need to be connected to the drain line upstream of this valve 248. Valve 246 is needed when the pool is being drained so that this line can be closed when the water pump 110 is being used to drain the pool 230.

Figure 5:
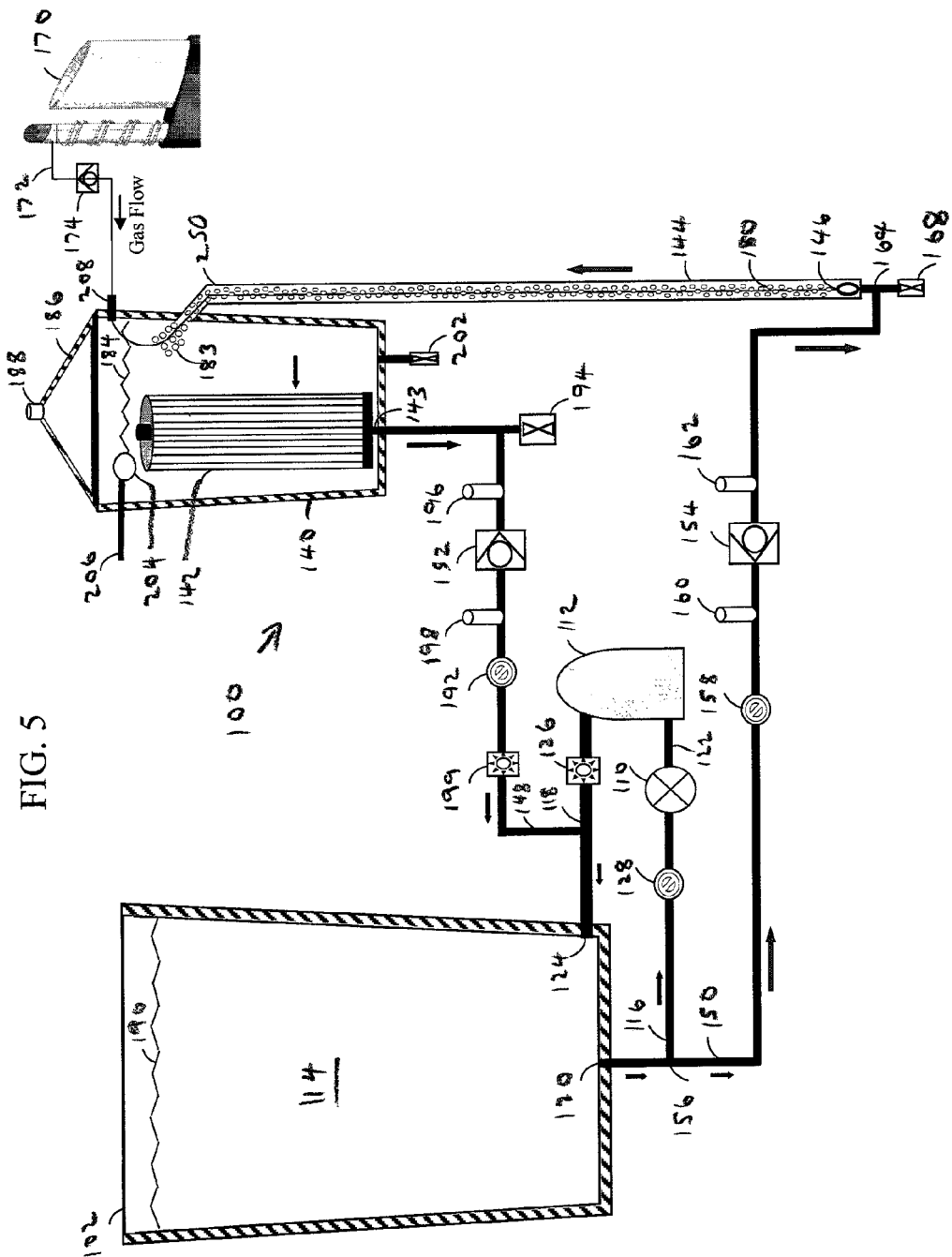
FIG. 5 illustrates an ozone-assisted fluid treatment apparatus for a fluid reservoir according to a fifth embodiment of the present invention.

FIG. 5 illustrates an ozone-assisted fluid treatment apparatus for a fluid reservoir according to a fifth embodiment of the present invention. FIG. 5 illustrates that the lift tube 144 may be bent at an angle, as seen at 250, where it enters the side of auxiliary fluid reservoir 140 rather than through the bottom surface of reservoir 140.

The ozone generator preferably operates 24 hours a day. The ozone generator 170 typically uses about 200 Watts of electricity. Germs and spores are greatly reduced or even eliminated using the system disclosed in FIG. 1 without the use of any chemicals. Solids wastes, skin, hair and other impurities are continuously filtered from the fluid without use of additives or chemicals. The nitrogen cycle (nitrates, nitrites, and ammonia) seems to be disrupted and renders the fluid relatively pH stable. Algae growth in the pool or spa seems to be greatly reduced, requiring less cleaning cycles. The ozone produced by the UV lamps is so small that ozone can be injected into the fluid 24 hours a day without irritating the users or inhibiting any possible bio-film that may add to the treatment of the water. This continuous filtration and use of a small amount of ozone inhibits bacteria and algae growth in the pool or spa. Harmful levels of ozone gas do not irritate the skin, eyes, throat, nose, lungs or bronchial tubes because the ozone gas is located in a separate tank several feet away.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the following claims and their equivalents.

What is claimed is:

1. An apparatus for ozone-aerating and filtering fluid in a main fluid reservoir, said main fluid reservoir including a high pressure water pump and a high pressure filter, a first conduit for enabling fluid in said main fluid reservoir to flow to said water pump and high pressure filter, and a second conduit for enabling fluid to flow from said water pump and high pressure filter to said main fluid reservoir, for enabling the circulation of fluid in said main fluid reservoir through said water pump and high pressure filter when the water pump is on, comprising:
    an auxiliary fluid reservoir positioned adjacent to and outside of the main fluid reservoir;
    a lift tube positioned outside of the main fluid reservoir and having an upper end and a lower end, said lift tube upper end open within the auxiliary fluid reservoir, said lift tube extending below the auxiliary fluid reservoir a predetermined length;
    a third conduit for enabling fluid in the auxiliary fluid reservoir to flow into the main fluid reservoir via said second conduit, said third conduit including a first check valve for preventing fluid flow in a direction from said second conduit to said auxiliary fluid reservoir;
    a fourth conduit for enabling fluid to flow by gravity from the main fluid reservoir into the lower end of said lift tube via said first conduit, said fourth conduit including a second check valve for preventing fluid flow in a direction from the lower end of said lift tube to said first conduit;
    a diffuser positioned inside said lift tube at its lower end for injecting ozonated air bubbles into the fluid in said lift tube, such that, when ozonated air bubbles are injected into said lift tube by the diffuser, the ozonated air bubbles come into contact with the fluid in said lift tube and ozone-aerates said fluid, and wherein the expansion of the ozonated air as it bubbles up said lift tube causes fluid in said lift tube to flow up said lift tube and into the auxiliary fluid reservoir, which causes the level of fluid in the auxiliary fluid reservoir to rise higher than the level of fluid in the main fluid reservoir, and thereby cause ozone-aerated fluid in the auxiliary fluid reservoir to flow by gravity into the third fluid conduit and into the main fluid reservoir at the same time causing fluid to be drawn through said fourth fluid conduit from the main fluid reservoir and into said lift tube; and
    a low pressure fluid filter positioned outside of the main reservoir and in the fluid path formed by said third and fourth fluid conduits, said lift tube, and said auxiliary fluid reservoir, for filtering the fluid flowing therein.

2. The apparatus of claim 1, wherein said low pressure fluid filter is positioned inside said auxiliary fluid reservoir to filter the ozone-aerated fluid before the fluid enters said third conduit.

3. The apparatus of claim 1, further comprising a fifth conduit for coupling ozonated air from an ozone generator to said diffuser.

4. The apparatus of claim 3, wherein said lift tube includes an opening at its lower end sized to enable the diffuser and fifth conduit to be inserted into said lift tube.

5. The apparatus of claim 3, wherein said diffuser and fifth conduit are inserted into said lift tube at its upper end.

6. The apparatus of claim 1, further comprising:
    a float valve positioned in said auxiliary fluid reservoir for sensing when the fluid level in said auxiliary fluid reservoir drops below a predetermined level; and
    a sixth conduit connected between said auxiliary fluid reservoir and an external fluid source to enable fluid to be added to said auxiliary fluid reservoir in response to said sensing.

7. The apparatus of claim 1, wherein said lift tube is at least ten feet long and has a diameter of between about one and one half inches and two inches.

8. The apparatus of claim 1, wherein the fourth conduit has a slope of at least 5 degrees down in the direction from the first conduit to the lower end of the lift tube, and wherein the third conduit has a slope of at least 5 degrees down in the direction from the auxiliary fluid reservoir to the second conduit.

9. The apparatus of claim 1, further comprising an ozone-capturing device positioned above the auxiliary fluid reservoir for capturing undissolved excess ozone gas emanating from the fluid in the Auxiliary fluid reservoir.

10. The apparatus of claim 1, wherein filtering surfaces of the low pressure fluid filter supports a filtering layer of biofilm comprising organic material.

11. The apparatus of claim 2, wherein the auxiliary fluid reservoir has a bottom and wherein said third conduit is connected to said low pressure fluid filter at the bottom of said auxiliary fluid reservoir.

12. The apparatus of claim 2, further comprising:
an out-flow valve in said third conduit to control the flow of ozone-aerated fluid from the auxiliary fluid reservoir to the second conduit;
an in-flow valve in said fourth conduit to control the flow of fluid from the first conduit to the auxiliary fluid reservoir; and
a first drain valve coupled to the lower portion of the auxiliary fluid reservoir for enabling drainage of the fluid in the auxiliary fluid reservoir when the first drain valve is open, such that, when the in-flow valve and the out-flow valve are closed, the low pressure fluid filter and the auxiliary fluid reservoir can be cleaned without contaminating the fluid in the main fluid reservoir.

13. The apparatus of claim 12, further comprising:
a second drain valve coupled to the lower end of said lift tube for enabling drainage of the fluid in said lift tube.

14. The apparatus of claim 1, further comprising:
a sensor for sensing when the fluid in the auxiliary fluid reservoir rises above a predetermined level and for generating an alarm signal in response to said sensing.

15. The apparatus of claim 1, wherein the lift tube enters the auxiliary fluid reservoir along the side of said auxiliary fluid reservoir at an angle that minimizes the coalescing of ozonated air bubbles in the fluid inside the lift tube.

16. The apparatus of claim 15, wherein said lift tube angle at the point where said lift tube enters the main fluid reservoir is 45 degrees.

17. The apparatus of claim 3, further comprising:
a check valve in said fifth conduit for preventing the flow of fluid from said diffuser to said ozone generator;
an ozone venturi injector positioned in said second conduit;
a seventh conduit for coupling ozonated air from said ozone generator to said ozone venturi injector;
a check valve in said seventh conduit for preventing the flow of fluid from said ozone venturi injector to said ozone generator; and
an ozone conduit valve for causing ozonated air from said ozone generator to be coupled to said fifth conduit when said water pump is off, and for causing ozonated air from said ozone generator to be coupled to said seventh conduit when said water pump is on.

18. An apparatus for ozone-aerating and filtering fluid in a pool having an infinity edge that enables water to flow out of said pool over said edge, a collection gutter for collecting the water flowing over said infinity edge, and a collection tank, said pool including a high pressure water pump and a high pressure filter, a first conduit for coupling the water in said collection tank to a water pump and high pressure filter, a drain conduit for coupling water from the bottom of said pool to said water pump, and a second conduit for connecting the water output by said water pump and high pressure filter to said pool for enabling the circulation of fluid in said pool through said water pump and high pressure filter when the water pump is on, comprising:
an auxiliary fluid reservoir positioned adjacent to and outside of the pool;
a lift tube positioned outside of the pool and having an upper end and a lower end, said lift tube upper end open within the auxiliary fluid reservoir, said lift tube extending below the auxiliary fluid reservoir a predetermined length;
a third conduit for enabling fluid in the auxiliary fluid reservoir to flow into the pool via said second conduit, said third conduit including a first check valve for preventing fluid flow in a direction from said second conduit to said auxiliary fluid reservoir;
a fourth conduit connected to said drain conduit for enabling fluid to flow by gravity from the pool into the lower end of said lift tube via said drain conduit, said fourth conduit including a second check valve for preventing fluid flow in a direction from the lower end of said lift tube to said first conduit;
a diffuser positioned inside said lift tube at its lower end for injecting ozonated air bubbles into the fluid in said lift tube, such that, when ozonated air bubbles are injected into said lift tube by the diffuser, the ozonated air bubbles come into contact with the fluid in said lift tube and ozone-aerates said fluid, and wherein the expansion of the ozonated air as it bubbles up said lift tube causes fluid in said lift tube to flow up said lift tube and into the auxiliary fluid reservoir, which causes the level of fluid in the auxiliary fluid reservoir to rise higher than the level of fluid in the pool, and thereby cause ozone-aerated fluid in the auxiliary fluid reservoir to flow by gravity into the third conduit and, at the same time, causing fluid to flow through said fourth fluid conduit and into said lift tube; and
a low pressure fluid filter positioned outside of the pool and in the fluid path formed by said third and fourth fluid conduits, said lift tube, and said auxiliary fluid reservoir, for filtering the fluid flowing therein.

* * * * *